US009479075B2

(12) United States Patent
Garcés et al.

(10) Patent No.: US 9,479,075 B2
(45) Date of Patent: Oct. 25, 2016

(54) MULTILEVEL CONVERTER SYSTEM

(71) Applicant: General Electric Company, Schenectady, NY (US)

(72) Inventors: Luis José Garcés, Niskayuna, NY (US); Di Zhang, Niskayuna, NY (US); Andrew Allen Rockhill, Mechanicville, NY (US)

(73) Assignee: General Electric Company, Niskayuna, NY (US)

( * ) Notice: Subject to any disclaimer, the term of this patent is extended or adjusted under 35 U.S.C. 154(b) by 119 days.

(21) Appl. No.: 13/955,607

(22) Filed: Jul. 31, 2013

(65) Prior Publication Data

US 2015/0036398 A1    Feb. 5, 2015

(51) Int. Cl.
*H02M 7/483* (2007.01)
*H02M 7/487* (2007.01)
*H02M 7/00* (2006.01)

(52) U.S. Cl.
CPC ............. *H02M 7/003* (2013.01); *H02M 7/483* (2013.01); *H02M 7/487* (2013.01); *H02M 2007/4835* (2013.01)

(58) Field of Classification Search
CPC ................. H02M 3/1584; H02M 2007/4835; H02M 7/003; H02M 7/483; H02M 7/487
USPC .......................................................... 363/65
See application file for complete search history.

(56) References Cited

U.S. PATENT DOCUMENTS

| | | | |
|---|---|---|---|
| 5,684,688 A * | 11/1997 | Rouaud ................... | H02M 1/34 363/132 |
| 6,005,788 A | 12/1999 | Lipo et al. | |
| 6,091,610 A | 7/2000 | Garcia et al. | |
| 6,466,458 B2 | 10/2002 | Zhang et al. | |
| 6,480,403 B1 * | 11/2002 | Bijlenga ............... | H02M 7/487 363/132 |
| 6,778,413 B2 | 8/2004 | Kates | |
| 7,960,871 B2 | 6/2011 | Dommaschk et al. | |
| 7,969,755 B2 * | 6/2011 | Davies et al. .................. | 363/35 |
| 8,045,346 B2 | 10/2011 | Abolhassani et al. | |
| 8,144,489 B2 | 3/2012 | Dommaschk et al. | |
| 8,233,300 B2 | 7/2012 | Dommaschk et al. | |
| 8,395,280 B2 | 3/2013 | Graovac et al. | |

(Continued)

FOREIGN PATENT DOCUMENTS

| | | |
|---|---|---|
| DE | 10103031 A1 | 7/2002 |
| EP | 2290799 A1 | 3/2011 |

(Continued)

OTHER PUBLICATIONS

A. Leisnicar et al.; An Innovative Modular Multilevel Converter Topology Suitable for a Wide Power Range, IEEE Bologna Power Tech Conference, Jun. 23-26, 2003, Bologna, Italy, 6 pages.

(Continued)

*Primary Examiner* — Jessica Han
*Assistant Examiner* — Bart Iliya
(74) *Attorney, Agent, or Firm* — Nitin N. Joshi

(57) ABSTRACT

A power converter is provided. The power converter includes at least one leg. The at least one leg of the power converter includes a plurality of switching units. The switching units are coupled with each other in a serial fashion. Further, in the power converter, the switching units are selected such that at least two switching units in the power converter have different operating voltages.

15 Claims, 4 Drawing Sheets

(56) References Cited

U.S. PATENT DOCUMENTS

| | | |
|---|---|---|
| 2005/0139259 A1 | 6/2005 | Steigerwald et al. |
| 2006/0044857 A1 | 3/2006 | Lemak |
| 2006/0056209 A1* | 3/2006 | Blidberg ............... H02M 7/487 363/63 |
| 2008/0175028 A1 | 7/2008 | Stefanutti et al. |
| 2008/0198637 A1 | 8/2008 | Meysenc et al. |
| 2009/0244936 A1 | 10/2009 | Falk et al. |
| 2009/0295225 A1 | 12/2009 | Asplund et al. |
| 2010/0060235 A1* | 3/2010 | Dommaschk ......... H02M 7/483 320/128 |
| 2011/0019453 A1 | 1/2011 | Gonzalez Senosiain et al. |
| 2011/0096575 A1 | 4/2011 | Asplund et al. |
| 2011/0115532 A1* | 5/2011 | Roesner et al. ............. 327/136 |
| 2012/0113699 A1 | 5/2012 | Crookes et al. |
| 2013/0016549 A1 | 1/2013 | Kieferndorf et al. |
| 2014/0092661 A1* | 4/2014 | Zhang et al. ................. 363/131 |
| 2014/0198548 A1* | 7/2014 | Zhang .................. H02M 7/487 363/131 |

FOREIGN PATENT DOCUMENTS

| | | |
|---|---|---|
| WO | 2007028350 A1 | 3/2007 |
| WO | 2011124260 A1 | 10/2011 |
| WO | 2013135277 A1 | 9/2013 |

OTHER PUBLICATIONS

Silke Allebrod et al., New Transformerless, Scalable Modular Multilevel Converters for HVDC-Transmission, IEEE, 2008, 6 pages.

Barker et al., "Reactive power loading of components within a modular multi-level HVDC VSC converter",Electrical Power and Energy Conference (EPEC), 2011 IEEE , Issue Date: Oct. 3-5, 2011, Print ISBN: 978-1-4577-0405-5, pp. 86-90.

Noman Ahmed et al.; HVDC SuperGrids with Modular Multilevel Converters—the Power Transmission Backbone of the Future, IEEE 9th International Multi-Conference on Systems, Signals and Devices, 2012, 7 pages.

Zhang et al.,"Multilevel Converter System", Pending U.S. Appl. No. 13/629,882, filed Sep. 28, 2012, GE, 36 pages.

Rodriguez et al., "Multilevel Voltage-Source-Converter Topologies for Industrial Medium-Voltage Drives", IEEE Transactions on Industrial Electronics, vol. No. 54, Issue No. 6, pp. 2930-2945, Dec. 1, 2007.

European Search Report and Opinion issued in connection with corresponding EP Application No. 14177891.0 on Jun. 16, 2015.

* cited by examiner

MULTILEVEL CONVERTER SYSTEM

BACKGROUND

The invention relates generally to power converters and more specifically to multilevel configurations of converters.

The utility and importance of power conversion has grown with advantages being achieved in applications such as motor drives, renewable energy systems, and high voltage direct current (HVDC) systems, for example. The multilevel converter is emerging as a promising power conversion technology for various medium and high voltage applications.

Multilevel converters offer several advantages over conventional two-level converters. For example, the power quality and efficiency of the multilevel converter is better than that of the two level converter. Also, multilevel converters are ideal for interfacing between a grid and renewable energy sources such as photovoltaic (PV) cells, fuel cells, and wind turbines.

Transformer-less multilevel converters have been designed using a modular structure. Such multilevel converters typically include a plurality of power modules that are coupled between DC buses. The modular structure of the converters allows stacking of these converters to provide different power and voltage levels.

In some modular multilevel converter embodiments, the power modules are controlled to control voltage observed at output terminals of the converters. Typically each power module contributes to one step of voltage control in the converter. In symmetric configurations, the number of power modules required to develop a converter of a desired voltage rating can be calculated by taking into consideration the voltage rating of the converter and the voltage step change required for control of the power converter.

For example, in symmetric configurations for a power converter with a voltage rating of 10 kV, and a voltage step of 1 kV, at least 10 1 kV power modules would be required to achieve the desired result. The number of power modules required to design desired power converters in a symmetric configuration thus increases with an increase in power converter voltage ratings.

The increase in number of power modules leads to increase in cost of the power converter. Further, an increase in power modules leads to reduction in efficiency of the power converter.

It is also possible to increase the voltage step change. In this case, fewer modules may be required to develop the desired voltage rating, but for the same average switching frequency, there will be an increase in the resulting ac voltage harmonics.

Hence there is a need for modular multi-level power converter systems that provide for the same voltage rating and harmonic performance as symmetric converters while reducing the number of power modules used.

BRIEF DESCRIPTION

In one embodiment of the present invention, a power converter is provided. The power converter includes at least one leg. The at least one leg includes a plurality of switching units. Operating voltages of at least two switching units are different from each other.

In another embodiment of the present invention, a system for power conversion is provided. The system includes a power source, a load, and a first power converter. The first power converter includes one or more legs, where each of the one or more legs includes a plurality of switching units. Operating voltages of at least two switching units are different from each other. Furthermore, the system includes a controller configured to control switching of the plurality of switching units.

DRAWINGS

Other features and advantages of the present disclosure will be apparent from the following more detailed description of the preferred embodiment, taken in conjunction with the accompanying drawings which illustrate, by way of example, the principles of certain aspects of the disclosure.

DETAILED DESCRIPTION

Figure 1:
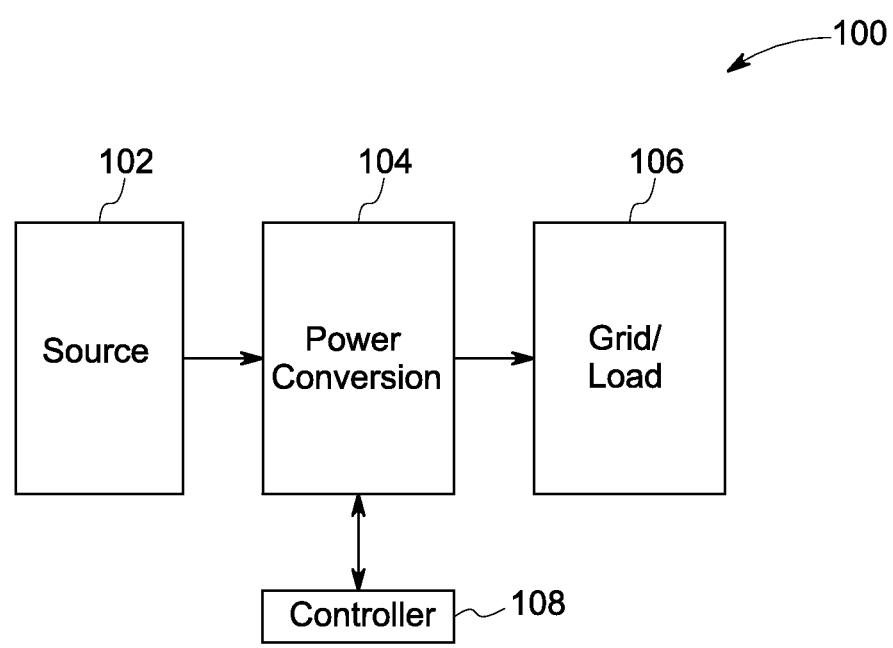
FIG. 1 is a diagrammatical representation of a system for power conversion.

Reference will be made below in detail to exemplary embodiments of the invention, examples of which are illustrated in the accompanying drawings. Wherever possible, the same reference numerals used throughout the drawings refer to the same or like parts.

As will be described in detail hereinafter, various embodiments of an exemplary system for multilevel power conversion are provided. The term multilevel converter, as used herein, is used to refer to a converter that includes multiple levels of switches connected to different phases of one form of input voltage/current and converts the input voltage/current to another form of output voltage/current.

FIG. 1 depicts a system 100 for converting power. In one embodiment, the system 100 for converting power may include a source 102, a power converter 104, and a grid/utility/load 106. The term source, as used herein, may comprise a renewable power source, a non-renewable power source, a generator, or a grid, for example. In another possible configuration, the source may comprise another power converter. The term load, as used herein, may be used to refer to a grid, a machine, or an electrical appliance, for example. The power converter 104 comprises a multilevel converter.

The system 100 further includes a controller 108 configured to control the operation of the power converter 104. By way of example, the controller 108 may be configured to control the operation of the power converter 104 by controlling switching of a plurality of semiconductor switches of the power converter 104. Furthermore, in one embodiment, the system 100 may also include other circuit components (not shown) such as, but not limited to, a transformer, a circuit breaker, an inductor, a compensator, a capacitor, a rectifier, a reactor, and a filter.

Figure 2:
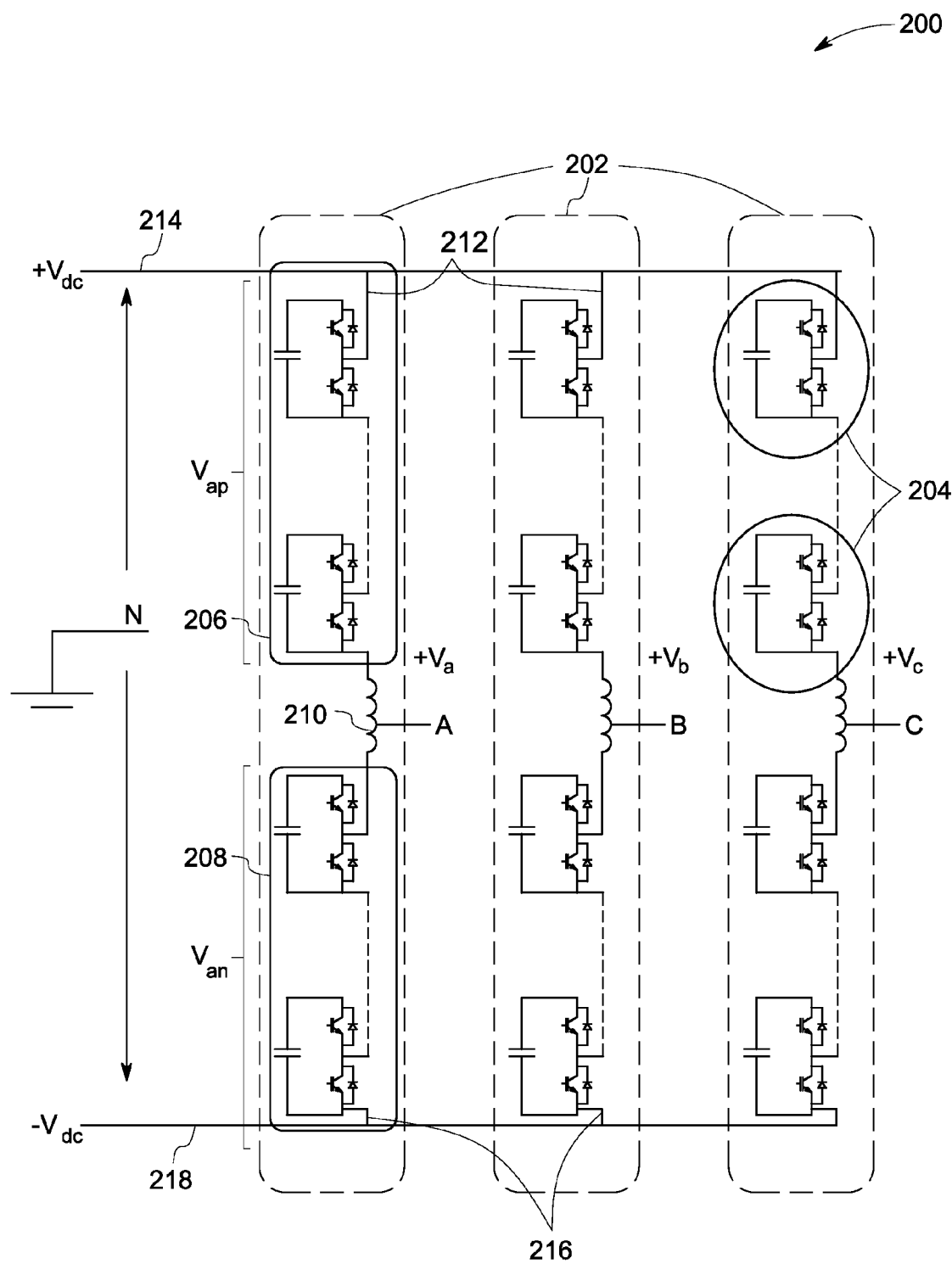
FIG. 2 is a diagrammatical representation of a conventional modular multilevel converter.

Referring now to FIG. 2, a diagrammatical representation of a power converter 200 is depicted. In the example of FIG. 2, the power converter 200 is a modular multilevel converter having three legs 202. Furthermore, each leg 202 includes a plurality of switching units 204 that are operatively coupled in a series fashion to define a string. The plurality of switching units 204 in each leg 202 may be split into a first portion 206 and a second portion 208. The first portion 206 and the second portion 208 may be operatively coupled to each other via an inductive element 210. In the illustrated embodiment, the inductive element 210 comprises an inductor. The inductive elements 210 are each operatively coupled to at least one alternating current (AC) phase (A, B, C).

The switching units 204 each include a combination of fully controllable semiconductor switches and an energy storage device such as a capacitive element. The fully controllable semiconductor switches may include insulated gate bipolar transistors (IGBTs), metal oxide semiconductor field effect transistors (MOSFETs), other types of field effect transistors (FETs), gate turn-off thyristors, insulated gate commutated thyristors (IGCTs), or injection enhanced gate transistors (IEGTs), for example, or combinations thereof. The materials of such switches may comprise silicon, silicon carbide, gallium nitride, or gallium arsenide, for example.

A first end 212 of each of the three legs 202 is operatively coupled to a first bus 214, such as a positive direct current (DC) bus. Similarly, a second end 216 of each of the three legs 202 is operatively coupled to a second bus 218, such as a negative DC bus. In certain embodiments, the first bus 214 and the second bus 216 may be AC buses. A first terminal is formed by a combination of the first bus 214 and the second bus 218 and a second terminal is formed by a combination of the AC phases A, B and C.

The voltage at the first bus 214 is $+V_{dc}$, and the voltage at the second bus 218 is $-V_{dc}$, with respect to a virtual ground reference point N. Also, the voltage at the alternating current phases A, B, and C are represented by $V_a$, $V_b$, and $V_c$, respectively.

In the embodiment of FIG. 2, at any instant of time, the leg 202 is coupled between the first bus 214 and the second bus 218. Accordingly, the branch 202 may have to handle the full DC voltage ($2V_{dc}$) appearing across the first bus 214 and the second bus 218. Also, for control of the power converter 200, the first portion 206 and the second portion 208 of the leg 202 may each have to withstand a maximum voltage of $2V_{dc}$. The voltage rating of the switching units 204 in each of the first and second portion also provide for a minimum voltage step that the power converter 200 can provide. Based on a selection of switching units, the power converter 200 can be termed as "symmetric" or "asymmetric". In symmetric configurations, each of the switching units 204 has the same rating and operating voltage. For example, when the voltage rating required for the leg 202 is 10 kV and the voltage rating for each switching unit is 1 kV, the number of switching units in the symmetric configuration of the power converter 200 would require at least 10 switching units. An embodiment of the present invention including an asymmetric configuration of the power converter 200 will be explained in greater detail in conjunction with FIG. 4.

Figure 3:
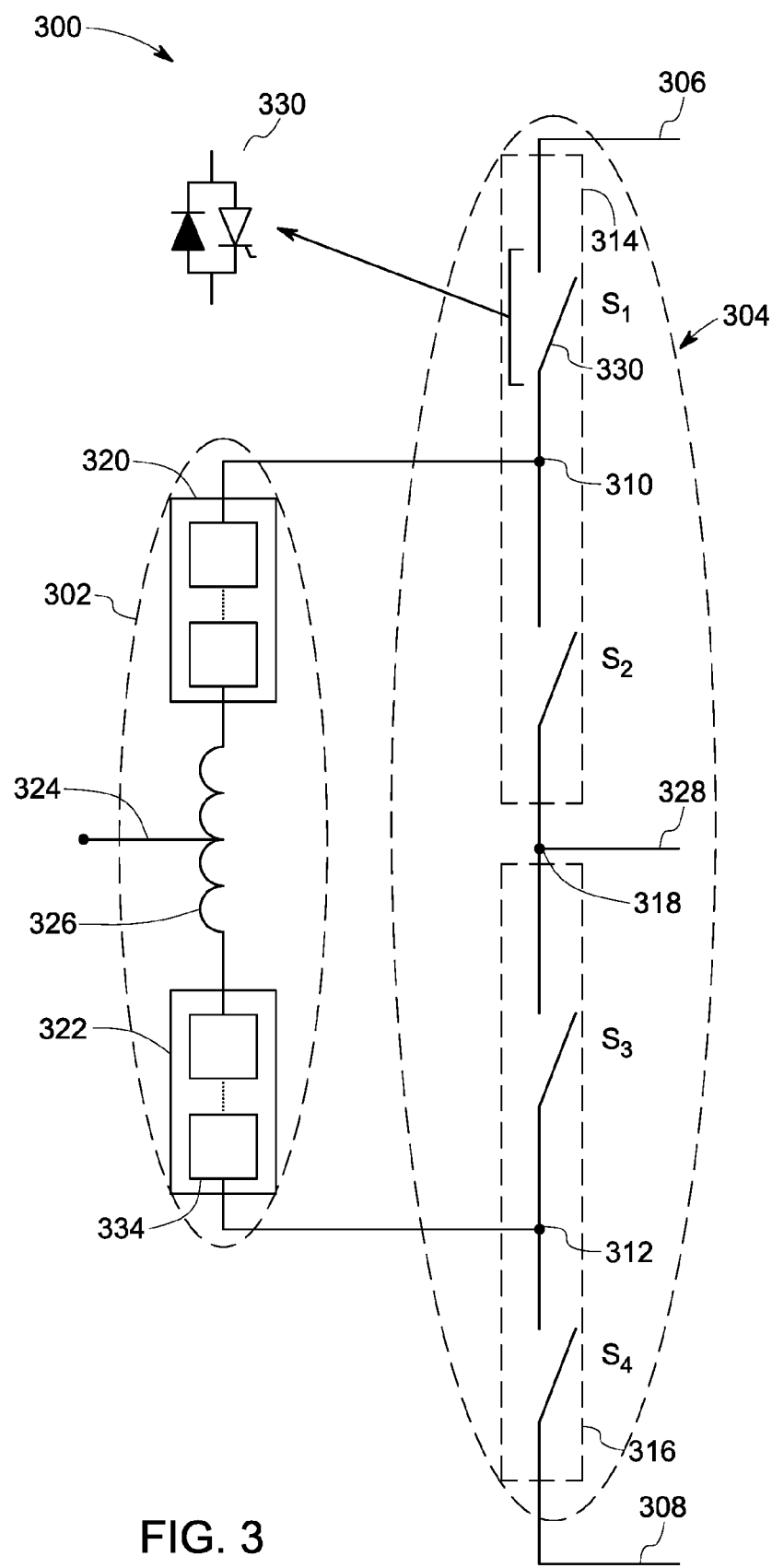
FIG. 3 is a diagrammatical representation of an exemplary embodiment of a portion of a another configuration of a modular multilevel converter.

In FIG. 3, a diagrammatical representation a different type of leg 300 of a power converter is depicted. The leg 300 of the power converter may include a first string 302 and a second string 304. More particularly, the first string 302 may be operatively coupled to the second string 304 to form the leg 300. Furthermore, the second string 304 may be operatively coupled between a first bus 306 and a second bus 308. In one embodiment, the first bus 306 may include a positive DC bus, and the second bus 308 may include a negative DC bus. In another embodiment, the first bus 306 may include a positive AC bus, and the second bus 308 may include a negative AC bus. The second string 304 may be operatively coupled to the first string 302 via a first connecting node 310 and a second connecting node 312. Also, the second string 304 may include a first branch 314 operatively coupled to a second branch 316 via a third connecting node 318. Similarly, the first string 302 may include a first portion 320 operatively coupled to a second portion 322 via an AC phase 324 and an inductor 326. The third connecting node 318 may be operatively coupled to a third bus 328.

Moreover, in the present example of FIG. 3, the third bus 328 may comprise a direct current bus and more particularly, a middle or center DC bus which may be at a negative potential with respect to the first bus 306 and at a positive potential with respect to the second bus 308. The second string 302 may include a plurality of controllable semiconductor switches $S_1$, $S_2$, $S_3$, and $S_4$ (330). In the example of FIG. 3, the plurality of controllable semiconductor switches 330 may include partially controllable semiconductor switches. However, in another embodiment, the plurality of controllable semiconductor switches may alternatively include fully controllable semiconductor switches. Moreover, the plurality of controllable semiconductor switches may include a combination of partially controllable semiconductor switches and fully controllable semiconductor switches. By way of a non-limiting example, the second string 302 may include partially controllable semiconductor switches, fully controllable semiconductor switches, or a combination of partially controllable semiconductor switches and fully controllable semiconductor switches. Furthermore, in one example, the first branch 314 of the second string 304 may include two controllable semiconductor switches $S_1$ and $S_2$. Similarly, the second branch 316 of the second string 304 may include two controllable semiconductor switches $S_3$ and $S_4$. The controllable semiconductor switches $S_1$, $S_2$, $S_3$, and $S_4$ may include a power diode in combination with a thyristor, a silicon controlled rectifier, a gate turnoff thyristor, or an IGBT, for example.

In addition, the first portion 320 and the second portion 322 of the first string 302 may include a plurality of switching units 334. The switching unit 334 may be a combination of a plurality of fully controllable semiconductor switches and at least one energy storage device.

The fully controllable semiconductor switches may include insulated gate bipolar transistors (IGBTs), metal oxide semiconductor field effect transistors (MOSFETs), other types of field effect transistors (FETs), gate turn-off thyristors, insulated gate commutated thyristors (IGCTs), or injection enhanced gate transistors (IEGTs), for example, or combinations thereof. The materials of such switches may comprise silicon, silicon carbide, gallium nitride, or gallium arsenide, for example. The switching units 334 in the first portion 320 and the second portion 322 are selected such that the voltage rating of the leg 300 is met and a minimum voltage step requirement of the power converter is fulfilled. In a symmetric configuration of the power converter, all the switching units 334 have the same voltage rating and they are selected such that the each switching unit 334 has a voltage rating equal to the minimum voltage step requirement of the power converter. An embodiment of the present invention including an asymmetric configuration of the power converter wherein the voltage rating of at least two switching units 334 is different from each other is described in conjunction with FIG. 4.

Furthermore, the leg 300 may be employed in a single phase power converter, a two phase power converter, a three phase power converter, and other equivalent multiphase DC to AC, AC to DC or AC to AC power converters. The switching of the fully controllable semiconductor switches in the first string 302 and the second string 304 may be controlled based on the output voltage observed at the output terminal.

In some embodiments, a power converter with the leg 300 may be coupled with another power converter with leg 300 to create a back-to-back power conversion configuration.

Figure 4:
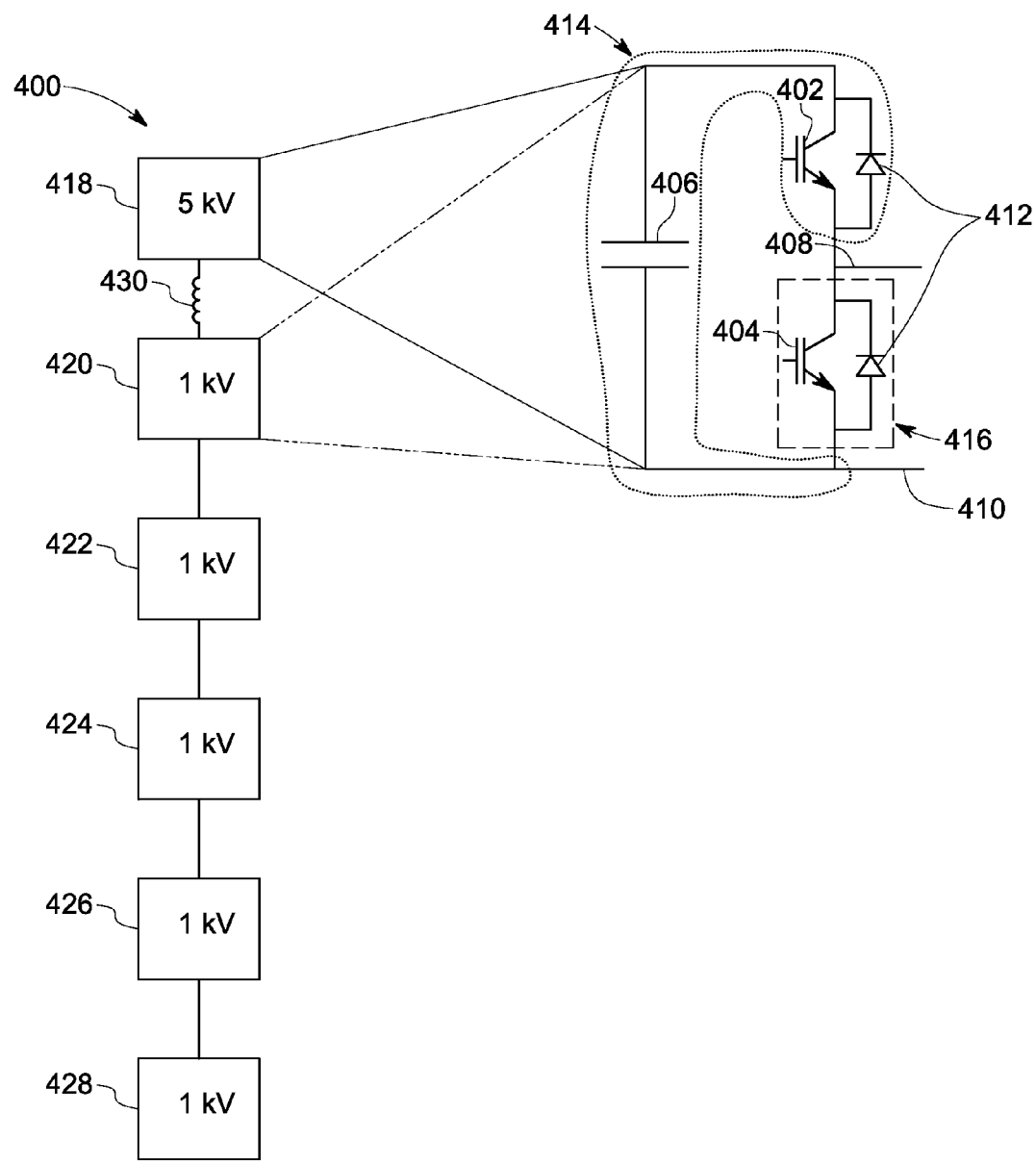
FIG. 4 is a diagrammatical representation of a portion of the modular multilevel converters according to aspects of the present disclosure.

FIG. 4 is a diagrammatical representation 400 of an exemplary embodiment of an asymmetric configuration of power converters which may be used as a replacement for leg 202 of FIG. 2 or first string 302 of FIG. 3. In the asymmetric configuration, the switching units 418-428 are selected such that the voltage rating requirement of the power converter is met along with a minimum voltage step requirement of the power converter. For example, as illustrated in FIG. 4, the operating voltages of at least two switching units of the switching units 418 and 420 are different. When the voltage rating required for a string 400 is 10 kV and the minimum voltage step required for control of the power converter is 1 kV, in one asymmetric configuration, five (5) switching units with a voltage rating of 1 kV may be selected along with one (1) switching unit with a voltage rating of 5 kV. In the illustrated embodiment, the leg 400 includes switching units 418, 420, 422, 424, 426, and 428. The switching units 418-428 are coupled with each other through inductive elements. For example, as illustrated in FIG. 4, the switching units 418 and 420 are coupled through an inductor 430. Similarly inductive elements may be placed in series with switching units 422-428. In the asymmetric configuration illustrated in FIG. 4, the switching unit 418 has a voltage rating of 5 kV, and the voltage rating for the switching units 420, 422, 424, 426, and 428 is 1 kV. The power converter using this branch as a component can still be utilized for voltages ranging from zero to plus-minus 5 kV. A controller coupled with the power converter is configured to activate and deactivate the switching units 418-428 according to the output voltage that is experienced by the output terminals. For example, when the output voltage is between 0 to 5 kV, some or all of the switching units 420-428 with voltage ratings of 1 kV are turned on. When the output voltage reaches the 5 kV, the switching unit 418 with voltage rating 5 kV is activated. When the output voltage is greater than 5 kV, the switching unit 418 with 5 kV voltage rating is switched on along with one or more of the switching units 420-428 with a voltage rating of 1 kV.

In the presently contemplated configuration, the switching units 418-428 may include fully controllable semiconductor switches 402 and 404, an energy storage device 406, a first connector 408, and a second connector 410. Each of the fully controllable semiconductor switches 402, 404, may comprise a switch of the type described above with respect to FIGS. 2 and 3 and may also include a power diode 412 that may be inbuilt and antiparallel to the fully controllable semiconductor switches 402 and 404. The inbuilt power diodes 412 may provide a freewheeling path. These power diodes 412 may also be referred to as freewheeling diodes.

Also, in one non-limiting example, the energy storage device 406 may include a capacitor. In the example of FIG. 4, the fully controllable semiconductor switch 402 may be operatively coupled in series to the energy storage device 406 to form a first limb 414. Also, the other fully controllable semiconductor switch 404 forms a second limb 416. The second limb 416 may be operatively coupled in parallel to the first limb 414. Additionally, the first limb 414 and the second limb 416 may be operatively coupled between the first connector 408 and the second connector 410. Although the example of FIG. 4 depicts the switching units 418-428 in a half bridge converter configuration as including two fully controllable semiconductor switches and one energy storage device, use of other numbers of fully controllable semiconductor switches 402, 404, and energy storage devices 406 is also contemplated. In one embodiment, some or all of the switching units may be arranged to form a full bridge converter configuration.

Furthermore, in one non-limiting example, when the fully controllable semiconductor switch 402 is activated and the fully controllable semiconductor switch 404 is deactivated, the energy storage device 406 may appear across the first connector 408 and the second connector 410. Consequently, the charge across the energy storage device 406 appears as a voltage across the first connector 408 and the second connector 410. Alternatively, when the fully controllable semiconductor switch 404 is activated and the fully controllable semiconductor switch 402 is deactivated, the first limb 414 is bypassed, thereby providing zero voltage across the first connector 408 and the second connector 410. Hence, by controlling the switching of the fully controllable semiconductor switches 402 and 404 in the plurality of switching units 418-428 on the first string 400, the average voltage developed across the first string 400 may be continuously regulated.

The above described embodiments of asymmetric multi-level power converters provide for systems for power conversion that require a lower number of switching units. For example, in case of a power converter with a voltage rating of 10 kV and maximum step requirement of 1 kV, the number of switching units required in the symmetric configuration will be 10, whereas in case of one asymmetric configuration, which includes using 1 5 kV unit and 5 1 kV units, the number of switching units required is 6. The reduction in number of switching units reduces the cost of the power conversion system and also reduces the complexity of designing the system without compromising the quality of the generated output voltage. Further, the reduction in number of switching units reduces the time involved in maintenance and repair of the power conversion system, in case of failure of switching units.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system for power conversion, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A power converter, comprising:
   at least one leg, comprising:
      a first string comprising a plurality of switching units operatively coupled in a serial fashion;
      a second string comprising a plurality of controllable semiconductor switches, a first connecting node, and a second connecting node, wherein the second string is operatively coupled across a first bus and a second bus and wherein at least one of the controllable semiconductor switches is connected between the first connecting node and the first bus and another at least one of the controllable semiconductor switches is connected between the second connecting node and the second bus;
      wherein the first string is operatively coupled to the second string via the first connecting node and the second connecting node; and
   wherein operating voltages of at least two switching units are different from each other.

2. The power converter of claim 1, wherein at least some of the plurality of switching units each comprise a plurality of fully controllable semiconductor switches and at least one energy storage device.

3. The power converter of claim 2, wherein the plurality of fully controllable semiconductor switches comprises insulated gate bipolar transistors, metal oxide semiconductor field effect transistors, gate turn-off thyristors, insulated gate commutated thyristors, injection enhanced gate transistors, or combinations thereof.

4. The power converter of claim 2, wherein the plurality of fully controllable semiconductor switches comprises silicon carbide based switches, gallium nitride based switches, gallium arsenide based switches, or combinations thereof.

5. The power converter of claim 1, wherein the second string comprises a first branch and a second branch, and wherein the second branch is operatively coupled to the first branch via a third connecting node.

6. The power converter of claim 5, wherein the third connecting node is operatively coupled to a third bus.

7. The power converter of claim 6, wherein the third bus comprises a direct or alternating current bus.

8. The power converter of claim 1, wherein the first string comprises a first portion and a second portion.

9. The power converter of claim 8, wherein the first and second portions of the first string are operatively coupled to a fourth bus.

10. The power converter of claim 9, wherein the fourth bus comprises an alternating current phase.

11. The power converter of claim 1, wherein the plurality of controllable semiconductor switches comprises partially controllable semiconductor switches, fully controllable semiconductor switches, or a combination thereof.

12. The power converter of claim 1, wherein terminals of all the plurality of controllable semiconductor switches are connected in series.

13. A system for power conversion, comprising:
   a power source;
   a load;
   a power converter, comprising:
      one or more legs, wherein each of the one or more legs comprises:
         a first string comprising a plurality of switching units operatively coupled in a serial fashion;
         a second string comprising a plurality of controllable semiconductor switches, a first connecting node, and a second connecting node, wherein the second string is operatively coupled across a first bus and a second bus and wherein at least one of the controllable semiconductor swiches is connected between the first connecting node and the first bus and another at least one of the controllable semiconductor switches is connected between the second connecting node and the second bus;
         wherein the first string is operatively coupled to the second string via the first connecting node and the second connecting node;
         wherein operating voltages of at least two switching units are different from each other; and
   a controller configured to control switching of the plurality of switching units.

14. The system of claim 13, wherein the load comprises a grid, an electrical appliance, or a combination thereof.

15. The system of claim 13, wherein each of the plurality of switching units comprise a half bridge converter, a full bridge converter, or a combination thereof.

* * * * *

UNITED STATES PATENT AND TRADEMARK OFFICE
CERTIFICATE OF CORRECTION

PATENT NO. : 9,479,075 B2  Page 1 of 1
APPLICATION NO. : 13/955607
DATED : October 25, 2016
INVENTOR(S) : Garcés et al.

It is certified that error appears in the above-identified patent and that said Letters Patent is hereby corrected as shown below:

On the Title Page

In Item (56), under "OTHER PUBLICATIONS", in Column 2, Line 1, delete "Leisnicar" and insert -- Lesnicar --, therefor.

In the Drawings

In Fig. 1, Sheet 1 of 4, for Tag "106", delete "Grid/Load" and insert -- Grid/Utility/Load --, therefor.

In the Specification

In Column 3, Line 22, delete "second bus 216" and insert -- second bus 218 --, therefor.

In Column 4, Lines 9-10, delete "second string 302" and insert -- second string 304 --, therefor.

In Column 4, Lines 21-22, delete "second string 302" and insert -- second string 304 --, therefor.

Signed and Sealed this
Seventh Day of March, 2017

Michelle K. Lee
*Director of the United States Patent and Trademark Office*